Nov. 11, 1947.  A. M. EVANS ET AL  2,430,712
DRUM AND BARREL TRUCK
Filed Aug. 12, 1946  2 Sheets-Sheet 1
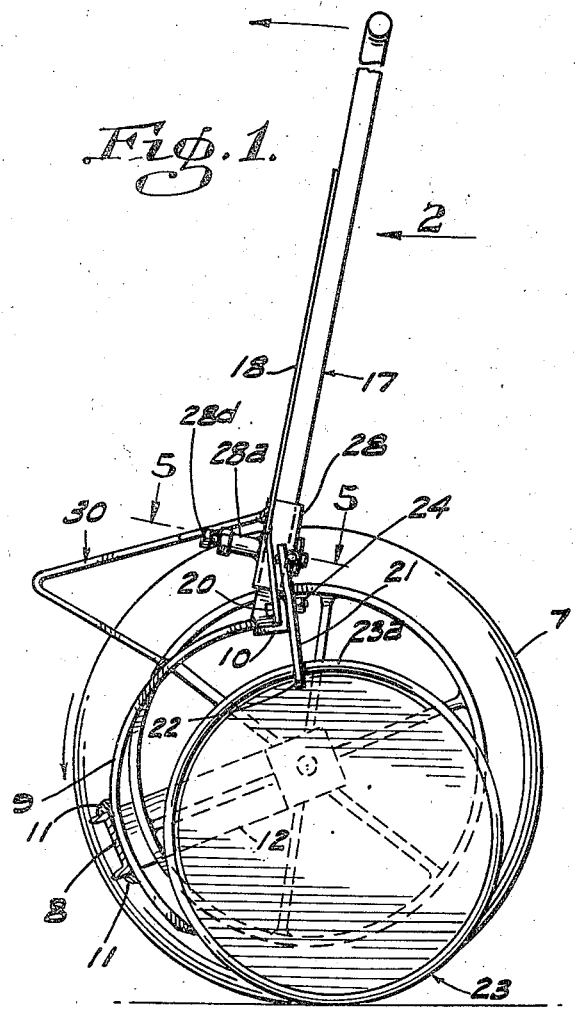
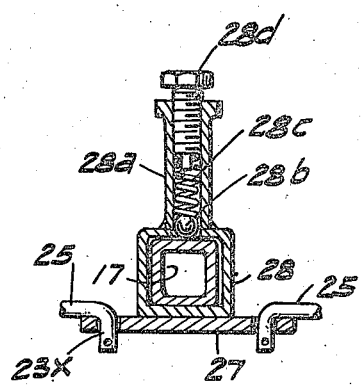
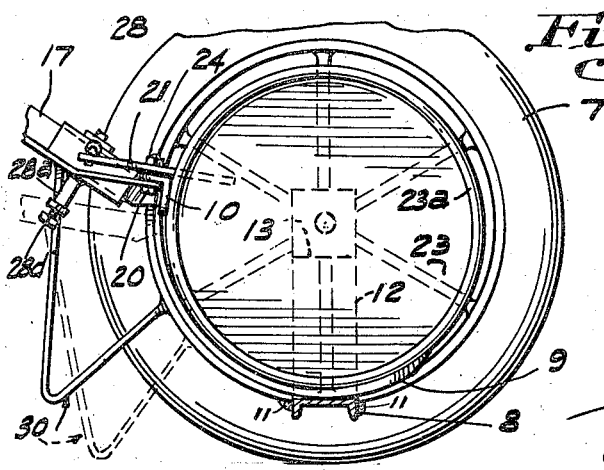
ALBERT M. EVANS
CLARENCE W. JOHNSON
and OTTO H. MOLLE
INVENTORS.
BY
ATTORNEY.

Nov. 11, 1947.   A. M. EVANS ET AL   2,430,712
DRUM AND BARREL TRUCK
Filed Aug. 12, 1946   2 Sheets-Sheet 2
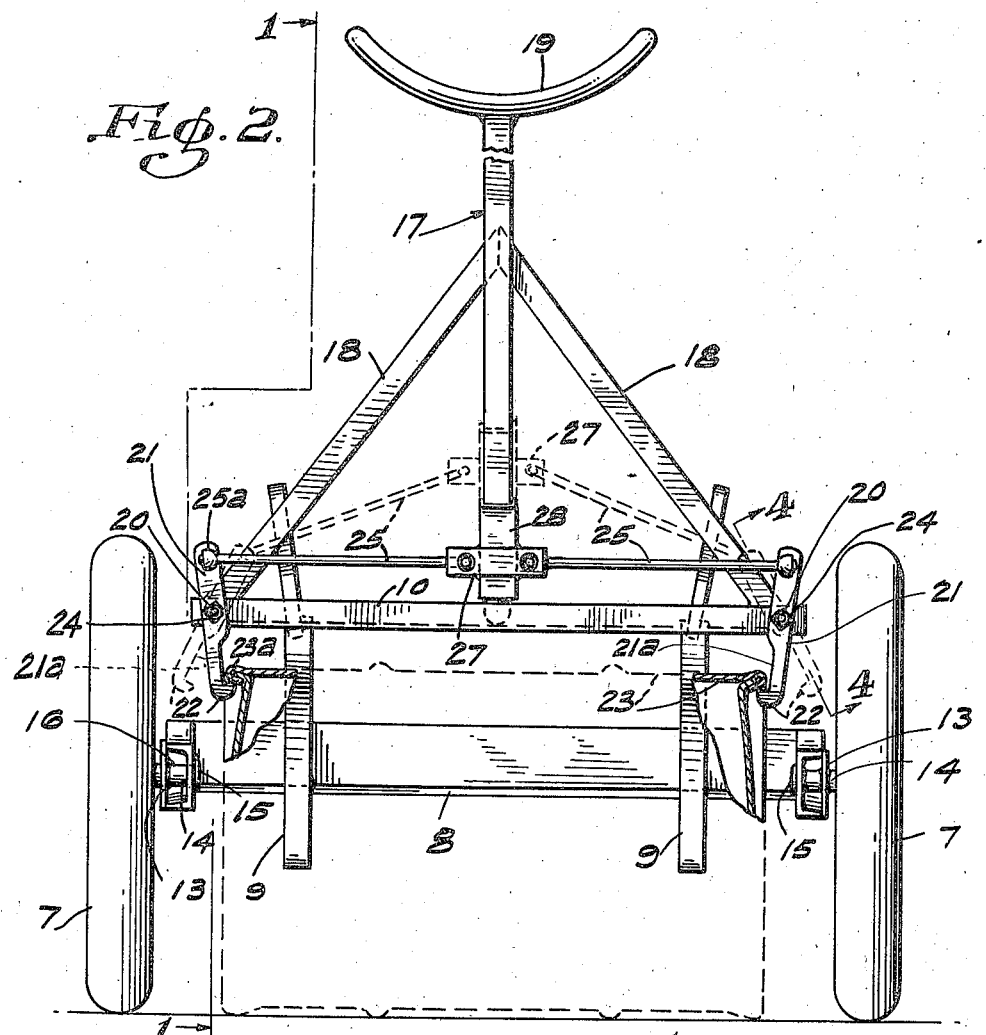
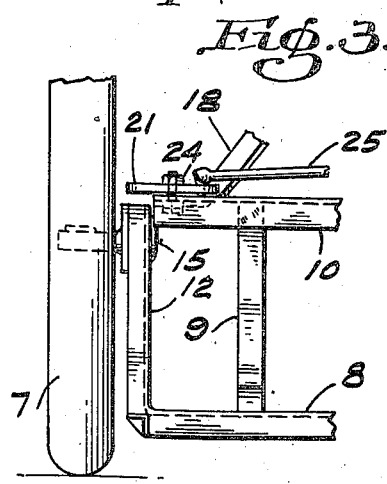
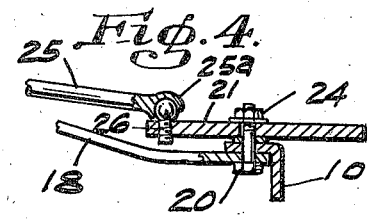
ALBERT M. EVANS
CLARENCE W. JOHNSON
and OTTO H. MOLLE
INVENTOR.

Patented Nov. 11, 1947

2,430,712

UNITED STATES PATENT OFFICE 2,430,712

DRUM AND BARREL TRUCK

Albert M. Evans, Lynwood, and Clarence W. Johnson and Otto H. Molle, Los Angeles, Calif.

Application August 12, 1946, Serial No. 690,066

10 Claims. (Cl. 214—65.5)

This invention relates to a drum and barrel truck.

An important object of the invention is to provide a truck of the kind stated with improved means for taking hold of the barrel or drum to be transported, in an endwise manner adjacent to its peripherally extended or flanged portion so as quickly and easily to load it upon the truck, safely maintain it in the loaded position while being carried to the desired point, and then dump it in an improved manner.

The invention further pertains, more specifically speaking, to utilizing a handle member whereby the truck is propelled, as a part of the mounting means for a hook-carrying device which is manually operable to take hold of a barrel or drum lying on the ground, in an endwise manner preparatory to loading it upon the truck.

A still further object of the invention is to provide an improved, cradle-like wheel-supported frame upon which to mount and from which to dump the drum or like object to be transported.

Other objects, advantages and features of invention will hereinafter appear.

Referring to the accompanying drawings, which illustrate a preferred embodiment of the invention, Fig. 1 is a vertical section taken on line 1—1 of Fig. 2, showing the truck positioned for picking up a drum-shaped container which is included in the view.

Fig. 2 is a view looking at Fig. 1 from right to left as indicated by the arrow near the former view.

Fig. 3 is a fragmentary rear end elevation of the frame of the truck in an unloaded condition, one of the ground wheels being included in the view.

Fig. 4 is a sectional detail on line 4—4 of Fig. 1.

Fig. 5 is an enlarged sectional detail taken on line 5—5 of Fig. 1.

Fig. 6 is a fragmentary view similar to Fig. 1, but showing the drum-shaped container loaded onto the truck.

Referring in detail to the drawings, the truck structure shown comprises the ground wheels 7 which carry the broadly U-shaped frame member 8 of channel shape in cross section, the pair of arcuate frame bars 9, the front portions of which rest upon and are welded or otherwise secured to said axle bar, and the angle iron cross bar 10, one of the flanges of which is directed downwardly in an overlying secured relation to the adjacent end portions of the arcuate bars 9. Said crossbar 10 has the open side of its channel directed downwardly and outwardly, and the two arcuate bars 9, which are of strap metal, overlie the body portion of said axle bar in a nearly flatwise manner so that spot welds 11 may be used efficiently to weld said arcuate bars to the crossbar.

Each of the upwardly directed arm portions 12 of the axle bar 8 has welded to its outer side a mounting plate 13 which bridges the space between its flanges, said plate being centrally apertured to receive an axle pin 14, the inner end of said pin projecting through an aperture in the adjacent web portion of the axle bar, said pin having its inner end peaned over at 15, welds 16 also being provided to hold said pin securely in place.

Returning to the crossbar 10, a propelling handle bar 17 has its front end secured centrally to said cross bar, and is additionally secured to the truck by means of the pair of brace bars 18, the outer end of said handle bar carrying an arcuate hand-hold and body-rest bar 19. Bolts 20 are utilized to secure the outer ends of said brace bars 18 to the cross bar and the upper end portions of said bolts serve to swingably mount midway between their ends the hook bars 21 having at their front ends hooks 22 which are directed toward the midwidth of the truck to engage the inner side of the rim flange 23a of the barrel or drum 23 preparatory to loading said drum upon the truck, and to aid in maintaining the drum in the loaded position until it is unloaded at the desired point. Nuts 24 are screwed on to the upper ends of the bolts 20 to hold in place the hook bars 21.

With a view to swinging the hook bars 21 to and from their gripping position a pair of operating links 25 are provided each of said links having a socketed outer end 25a which fits over the globular head of a pin 26 screwed into the hook bar 21 at that side of the truck; and its inner end downwardly directed at 25X and pivotally connected with a link plate or connecting member 27 whereby the adjacent inner end portions of said links 25 are connected to each other. Said link plate 27 is secured to the upper side of the sleeve 28 which is slidably mounted upon the front end portion of the handle member 17.

In order to prevent said sleeve from rocking on said handle member the latter is made square in cross section and the sleeve is correspondingly shaped so as to slide non-turnably on said member. To frictionally maintain said sleeve in adjusted position it is provided with a tubular extension 28a containing a ball 28b continually pressed against the handle member 17 by means of a spring 28c the tension of which may be regulated by adjusting the screwthreaded follower 28d.

Adjacent to each side of the truck is provided a V-shaped strap metal leg 30 the front run of each leg having its upper end portion welded to the outer side of the arcuate bar 9 at that side of the truck, and the upper end of its rear run welded to the under side of the adjacent brace bar 18. Said legs 30 cooperate with the ground wheels to support the truck in wheelbarrow fashion when it is loaded.

In operating the truck, when the operator wishes to advance the sleeve 28 on the handle member so as to move the hook-carrying arms to the drum-engaging position, he grasps the extension 28a of the sleeve 28 and advances the sleeve to the full line position shown in Fig. 2. The pressure of the ball 28b against the handle member under the impulse of the spring 28c maintains the sleeve in its adjusted position, thus also maintaining the hooked ends of the hook-bars 21 in their adjusted positions, at this time in a position to engage the inner side of the flange 23a of the drum 23 to be loaded onto the truck.

In the operation of picking up the drum the truck is advanced and at the same time the handle member is swung forwardly till inclined somewhat beyond the vertical as shown in Fig. 1, the truck having at the same time been wheeled up to the drum 23 till the front ends of the cradle bars 9 contact therewith, as shown in said view. Thereupon the sleeve is advanced in the manner already described to the locking position shown in full lines in Fig. 2, thus causing the hooks to engage within the rim flange of the drum to be picked up. When the hooks are thus positioned it will be noted that they do not abut against the somewhat convex end walls of the drum, but there is enough clearance provided between the hooks and said end walls to permit the drum to rotate backwardly into the cradle-shaped frame of the truck without the bulged ends of the drum contacting the hooks and preventing this inward motion. The backward rotation of the drum to loaded position is caused by swinging the handle member 17 backwardly from the position of Fig. 1 to that of Fig. 6.

When the operator has transported the drum-shaped article to the place where he wants to unload it from the truck, he again elevates the handle member to the position shown in Fig. 1, whereupon the hooks (which meantime have remained in their inswung positions) again engage the rim of the drum and support it during the operation of unloading it from the cradle-shaped frame, thus preventing an unpleasant reactive movement of the drum against the truck at that time.

It will be seen that the already described efficient operation of the hook bars 21 is not due alone to their being internally cut out at 21a, but is also due to their pivot bolts 20 being located sufficiently far apart to cause the hooked ends to incline toward each other when said bars are in the drum-engaging position.

What is claimed is:

1. In a truck of the kind described, a frame including a horizontal crossbar, a pair of axially alined ground wheels supporting said frame, the axis of said wheels being in a parallel, considerably spaced relation to said crossbar, a hook-bar swingably mounted upon each end portion of said crossbar, said hook-bars being pivoted between their ends to said crossbar and positioned with hook-carrying front end portions to swing to and from an engaging relation to the ends of a drum-like object to be transported by the truck, a pair of links disposed in an endwise relation to each other, said links having outer ends pivoted to said hook-bars, a connecting member to which the inner ends of said links are pivotally connected, said connecting member having a sleeve portion, and a handle member secured to the midlength part of said crossbar and extending in a front-to-rear direction in relation to the truck, said sleeve portion being slidably mounted upon said handle member to slide therealong when moved to operate said links and thus swing said hook bars.

2. In a truck of the kind described, a vehicle comprising a single pair of axially alined ground wheels and a cradle-like frame supported by and between said wheels, two cooperating hook-bars, one swingably mounted between its ends upon each side portion of said frame in an inwardly adjacent relation to the wheel at its side of the truck, a handle member usable in manually propelling the truck and in tilting it to and from dumping position, and manually operable means slidable along said handle and connected to the ends of said hook-bars that are opposite to their hooks simultaneously to swing said hook-bars about their pivotal mountings to and from positions for engaging in an endwise manner a drum-like object to be picked up transported upon and dumped from the truck, the portions of said hook-bars adjacent to their hooks inclining toward each other when said hook-bars are fully swung toward their engaging position.

3. In a truck of the kind described, a vehicle comprising a single pair of axially alined ground wheels and a cradle-like frame supported by and between said wheels, two cooperating hook-bars, one swingably mounted between its ends upon each side portion of said frame in an inwardly adjacent relation to the wheel at its side of the truck, a handle member usable in manually propelling the truck and in tilting it to and from dumping position, and means for swinging said hook-bars comprising more or less axially alined links having adjacent inner ends and outer ends pivotally connected with the ends of said hook-bars farthest from their hooks, and a connecting member to which the inner ends of said links are pivotally connected, said connecting member being slidable along said handle member in a non-turnable manner to operate said links, thus to swing said hook-bars so as to move their hooks to and from positions for engaging in an endwise manner a drum-like object to be picked up, transported and dumped by the truck.

4. In a truck of the kind described, a pair of axially alined ground wheels, a U-shaped frame member normally having a low-lying body portion and upwardly directed arms, means swingably connecting said arms to said ground wheels adjacent to the inner sides of the latter, a pair of downwardly convexed bars positioned in a parallel spaced apart relation to each other and in a front to rear direction in relation to the truck, each of said bars being secured to said body portion of the aforesaid frame member at a point spaced inwardly from its said arms, said convex bars each having a front end portion which projects considerably forward from the body portion of said frame member for being swung under a drum shaped object to be loaded onto the truck, a crossbar to which said convex bars are connected rearwardly of the body portion of said frame member, and a handle member in a secured relation to said crossbar and extending rearwardly thereof for use in propelling the truck.

5. The subject matter of claim 4, and the body portion of said frame member being channel shaped in cross section and said convex bars being in an abutting secured relation to the side thereof opposite to its channel.

6. The subject matter of claim 4, and said frame member being channel shaped in cross section with the channel of its arm portions directed outwardly, a bearing plate secured to each of said arms in an overlying relation to its channel, and axle pins for the ground wheels secured to said arms and projecting outwardly through said bearing plates in a secured relation to them and having inner ends secured to the webs of said arms.

7. In a truck of the kind described, a pair of axially alined ground wheels, a U-shaped frame member normally having a low-lying body portion and upwardly directed arms, said frame member being channel shaped in cross section with the channels of its arms directed outwardly, a bearing plate secured to each of said arms in an overlying relation to its channel, and axle pins for the ground wheels secured to said arms and projecting outwardly through and secured to said bearing plates and having inner ends secured to the webs of said arms.

8. In a truck of the kind described, a vehicle comprising a single pair of axially alined ground wheels and a cradle-like frame supported by and between said wheels, two cooperating hook-bars, one swingably mounted between its ends upon each side portion of said frame in an inwardly adjacent relation to the wheel at its side of the truck, a handle member secured to said frame and usable in manually propelling the truck and in tilting it to and from dumping position, and a manually operable means adjustably mounted on said frame and connected to said hook-bars about their pivotal mountings to and from positions for engaging in an endwise manner a drum-like object to the picked up by, transported and dumped from the truck, there being enough clearance between the hooks of said hook bars to unobstruct the backward rotation of said drum-like object by avoiding contact with its bulged ends during its movement into said cradle-shaped frame when the rims around the ends of such drum-like object have been internally engaged by said hooks.

9. In a truck of the kind described, a vehicle comprising a single pair of axially alined ground wheels and a cradle-like frame supported by and between said wheels, two cooperating hook-bars, one swingably mounted between its ends upon each side portion of said frame in an inwardly adjacent relation to the wheel at its side of the truck, a handle member usable in manually propelling the truck and in tilting it to and from dumping position, and manually operable means simultaneously to swing said hook-bars about their pivotal mountings to and from positions for engaging in an endwise manner a drum-like object to be picked up by, transported and dumped from the truck, said hook bars being internally cut-away to provide clearances which unobstruct the backward rotation of said drum-like object by avoiding contact with its bulged ends during its movement into said cradle-shaped frame when the rims around the ends of such drum-like object have been internally engaged by said hooks.

10. In a truck of the kind described, a vehicle comprising a single pair of axially alined ground wheels and a cradle-like frame supported by and between said wheels, two cooperating hook-bars, one swingably mounted between its ends upon each side portion of said frame in an inwardly adjacent relation to the wheel at its side of the truck, a handle member usable in manually propelling the truck and in tilting it to and from dumping position, and manually operable means simultaneously to swing said hook-bars about their pivotal mountings to and from positions for engaging in an endwise manner a drum-like object to be picked up by, transported and dumped from the truck, said hook bars being internally cut-away to provide clearance which unobstructs the backward rotation of said drum-like object by avoiding contact with its bulged ends during its movement into said cradle-shaped frame when the rims around the ends of such drum-like object have been internally engaged by said hooks, said pivotal mountings of said hooks being positioned sufficiently far apart to cause the hooked ends of said hook bars to incline toward each other when said bars are in the drum-engaging position.

ALBERT M. EVANS.
CLARENCE W. JOHNSON.
OTTO H. MOLLE.

REFERENCES CITED

The following references are of record in the file of this patent:

UNITED STATES PATENTS

| Number | Name | Date |
|---|---|---|
| 135,247 | Senderling | Jan. 28, 1873 |
| 453,086 | Lutes | May 26, 1891 |
| 1,255,070 | Waller | Jan. 29, 1918 |
| 1,449,011 | Littlefield | Mar. 20, 1923 |
| 1,681,944 | Marshall, Jr. | Aug. 28, 1928 |
| 1,884,861 | Remde | Oct. 25, 1932 |

FOREIGN PATENTS

| Number | Country | Date |
|---|---|---|
| 719,193 | France | Nov. 14, 1931 |